United States Patent Office 2,844,567
Patented July 22, 1958

2,844,567

VISCOUS POLYCARBOXYLATE ADDUCTS FROM BUTADIENE-TYPE RUBBERS

Joachim Dazzi, Dayton, Ohio, assignor to Monsanto Chemical Company, St. Louis, Mo., a corporation of Delaware No Drawing. Application April 27, 1953
Serial No. 351,511

19 Claims. (Cl. 260—83.3)

This invention relates to high-molecular weight adducts and more particularly provides linear polymeric compounds having a plurality of carboxylate radicals and a process for producing the same.

An object of the invention is the provision of new and useful polycarboxylates. Another object of the invention is the preparation of high-molecular weight, viscous polycarboxylates from readily available synthetic rubbers. Still another object of the invention is the preparation of high-molecular weight, viscous linear polycarboxylates from butadiene-type rubbers. A further object of the invention is to provide for the synthetic resins and plastics, petroleum, rubber, coatings and textile industries a new class of viscous polymeric materials having a high content of carboxylate radicals.

These and other objects of the invention hereinafter disclosed are provided by the following invention wherein there are prepared high molecular weight, viscous adducts of (1) a rubber-like synthetic product selected from the class consisting of polymerization products of butadiene hydrocarbons and copolymerization products of butadiene hydrocarbons with substances capable of copolymerizing therewith with (2) an ester having the formula

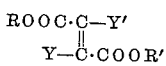

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals, and Y and Y' are selected from the class consisting of hydrogen, chlorine and the methyl radical, from 1 to 2 moles of said ester being combined at each of at least 5 percent of the repeated olefinic units of said rubber-like synthetic product.

Esters having the above formula and useful for the present purpose include fumarates, chlorofumarates, dichlorofumarates, mesaconates and dimethyl fumarates, e. g., the simple alkyl fumarates such as methyl, ethyl, isopropyl, n-propyl, n-butyl, tert-butyl, isoamyl, n-hexyl, n-heptyl or isooctyl fumarate; the mixed alkyl fumarates such as ethyl methyl fumarate, methyl n-octyl fumarate and butyl 2-ethylhexyl fumarate; the simple alkoxyalkyl fumarates such as bis(2-methoxyethyl), bis(3-ethoxy-n-propyl), and bis(4-butoxybutyl) fumarates; the mixed alkoxyalkyl fumarates such as 3-propoxypropyl 2-ethoxyethyl fumarate or methoxymethyl 2-amyloxyethyl fumarate and fumarates derived from both a fatty alcohol and a glycol mono-ether such as ethyl 2-ethoxyethyl fumarate or n-amyl 3-propoxy-2-propyl fumarate, the hydroxyalkyl fumarates such as bis(2-hydroxyethyl) fumarate or n-propyl 3-hydroxypropyl fumarate; the alicyclic fumarates such as cyclopropyl fumarate, cyclopentyl fumarate and cyclohexyl fumarate or octyl cyclopentyl fumarate; the alkylmercaptoalkyl fumarates such as bis(4-ethylmercaptobutyl) fumarate; the aryl fumarates such as phenyl fumarate, β-naphthyl fumarate and 2-xenyl fumarate or ethyl phenyl fumarate or 2-ethoxyethyl β-naphthyl fumarate; the aralkyl fumarates such as benzyl fumarate or amyl benzyl fumarate; furfuryl fumarate, tetrahydrofurfuryl fumarate, phenyl furfuryl fumarate; as well as the corresponding chlorofumarates, e. g., butyl chlorofumarate or ethyl phenyl chlorofumarate; the corresponding dichlorofumarates, e. g., bis(2-ethoxyethyl) dichlorofumarate; the corresponding mesaconates, e. g., 2-xenyl mesaconate; the corresponding dimethylfumarates, e. g., n-amyl dimethylfumarate, etc.

Polymers or copolymers which add to the above fumarates are the rubber-like polymers of butadiene hydrocarbons such as 1,3-butadiene, isoprene, piperylene, dimethylbutadiene, 2-methylpentadiene, 2-ethylhexadiene and the like or copolymers of such hydrocarbons and an unsaturated compound capable of copolymerizing therewith to yield rubber-like products, e. g., styrene, α-methylstyrene, the ar-chloro-substituted styrenes; acrylonitrile or methacrylonitrile; the lower alkyl acrylates or methacrylates such as ethyl acrylate or methyl methacrylate; unsaturated ketones such as methyl vinyl ketone or isopropenyl methyl ketone; vinyl halides such as vinyl chloride, vinyl fluoride or the chlorofluoroethylenes; the dialkyl fumarates or maleates such as dimethyl fumarate or diethyl maleate, etc. The presently useful copolymers may also be rubber-like products derived by copolymerization of two or more different butadiene hydrocarbons, e. g., from a mixture of butadiene and piperylene, either in the presence or absence of one or more non-dienic copolymerizable monomers.

Reaction of the synthetic rubber-like products with the present esters to form the viscous adducts takes place readily by heating the rubber with the ester in the presence or absence of an inert diluent or rubber-solvent at ordinary or superatmospheric pressures. When operating at atmospheric pressure, temperatures of from, say, 125° C. to 300° C. and preferably of from 150° C. to 225° C. are used. When working with readily polymerizable esters, an inhibitor of polymerization may be incorporated into the reaction mixture. The number of carboalkoxy groups introduced into the macromolecule depends upon the diene-content of the polymer or copolymer, upon the nature of the individual ester used, and upon the reaction conditions employed. Generally, operation within the higher temperature ranges, i. e., at temperatures of above, say, 180° C. and below the decomposition point of any of the reactants leads to introduction of more carboalkoxy groups than does operation at the lower temperatures. The degree of carboxylation also depends upon the individual fumarate employed. Usually the lower alkyl fumarates are more reactive than either the higher alkyl fumarates or the higher alkoxyalkyl fumarates. In view of the effect of the reaction conditions and nature of the reactants upon the extent of carboalkoxylation, it is recommended that for each initial run there be experimentally determined the operating conditions which should be observed for obtaining the desired degree of carboalkoxylation.

The quantity of fumarate or like ester present in the adduct will also depend upon its availability in the reaction mixture. Obviously, for the formation of adducts in which at least one mole of the fumarate has added to each olefinic unit of the rubber, the calculated amount of fumarate must be present in the reaction mixture.

Since the presently useful fumarates are very good solvents for the rubber-like polymers under the reaction conditions used, no extraneous solvent or diluent need be employed. However, in order to facilitate handling of the rubber, it is advantageous to work with a solution of the rubber in an inert, extraneous diluent or solvent, e. g., a liquid hydrocarbon or a liquid derivative thereof such as benzene, xylene, nitrobenzene or dichlorobenzene, a high-boiling aliphatic hydrocarbon such as kerosene, etc. When working at atmospheric pressure such diluent is generally removed before reaction of the rubber with the fumarate occurs, due to the high temperatures used. For successful reaction, the diluent may or may not be present. In order to avoid over-heating, the heating and distilling operations are preferably conducted on the oil-bath.

The contemplated use of the diene rubber-fumarate adducts will determine the extent of carboalkoxylation desired. Adducts having a low proportion of carboalkoxy radicals are advantageously employed as adhesives and bonding agents, particularly as adhesives in bonding fibers such as rayon cord to rubber in tire-manufacturing processes. Adducts having a higher proportion of carboalkoxy groups on the other hand, may be usefully employed as lubricant additives.

That the present reaction products are adducts rather than blends of the diene rubbers and polymeric fumarates is evidenced by hydrolysis of the reaction products to completely water-soluble materials. Thus, upon heating the present reaction products, e. g., the adduct of ethyl fumarate and 79:21 butadiene-styrene rubber of Example 1, with aqueous alkali metal hydroxides or ammonia, they are converted to water-soluble salts. The degree of water-solubility of the hydrolysis product, depends of course, upon the extent of carboalkoxylation. Treatment of the salts with mineral acids yields the free polycarboxylic acids. The present invention thus provides not only the ester adducts, but also a new series of polycarboxylic acids and their salts.

The invention is further illustrated, but not limited, by the following examples:

*Example 1*

This example describes the preparation of an adduct from a butadiene-styrene rubber known to the trade as GRS–X–565 and containing 79 percent by weight of butadiene and 21 percent by weight of styrene.

A solution of 30 grams of the rubber in 270 g. of benzene was prepared and placed in a 1-liter 3-necked flask equipped with a mechanical stirrer, dropping funnel, thermometer and an inlet tube which reached the bottom of the flask and a 10-inch Vigreux column having a Dean and Stark water-trap, reflux condenser and thermometer. The solution was heated, with stirring, to a temperature of 80° C., at which point the benzene began to distill off. A total of 300 g. of ethyl fumarate was added to the solution at the rate at which the benzene distilled. Addition of the fumarate in this manner required 1 hour. At this time all of the benzene had been removed, and the temperature of the reaction mixture, heated by means of an oil-bath, had reached 195° C. It was then stirred in a nitrogen atmosphere for 5 hours at 190–195° C. The cooled reaction mixture was a clear, slightly viscous, liquid which was soluble in hexane and ethanol. Unreacted ethyl fumarate (211 g.) was distilled off at 1 mm. Hg pressure and the residue was heated to an oil-bath temperature of 160° C. in a nitrogen atmosphere at a pressure of 1 mm. of Hg in order to remove any other unreacted material. The residue (110.3 g.) was a brown, viscous material analyzing 66.11% C, 7.86% H, and (by difference) 26.3% O. Based on the unreacted, recovered initial materials and the weight increase of the residue over the initial rubber, the viscous material is an adduct in which 0.468 mole (80.3 g.) of ethyl fumarate had added to 0.465 mole of butene units in the 79:21 butadiene-styrene copolymer. Since the calculated values for a 79:21 butadiene-styrene adduct in which each butene unit had added to 1 mole of ethyl fumarate is 65.2% C, 7.82% H and O (by difference) 26.98%, the weight increase of product and the analysis all point to characterization of the viscous, brown residue as an adduct in which each butene unit of the 79:21 butadiene-styrene copolymer had combined with one mole of the diethyl fumarate. In view of the fact that commercially available butadiene-styrene rubbers always contain small amounts of impurities, the agreement of the calculated carbon, hydrogen values with the observed values shown above is remarkable. The material recovery in the present experiment was 97.4%, indicating substantially no decomposition of the reactants.

*Example 2*

This example is like Example 1, except that larger quantities of the reactants were used.

A solution of 116 g. (1.8 moles) of the GRS–X–565 butadiene-styrene rubber in 1160 g. of benzene was heated until the benzene started to distill off, and during a period of two hours a total of 1160 g. of ethyl fumarate was added dropwise to the vigorously stirred, distilling reaction mixture. At the end of this time the pot temperature was 182° C. The reaction mixture was then heated for 7 hours at a pot temperature of 185–190° C. and an oil-bath temperature of ca. 210° C. Distillation of unreacted material was effected at 1.0 mm. Hg pressure and an oil-bath temperature of 190° C. There was thus obtained as residue 285 g. of a light brown, viscous material, $n_D^{25}$ 1.4988, analyzing 66.55% C, 7.97% H, and (by difference) 25.48% O. This adduct thus corresponds to that of Example 1. The adducts of this example and of Example 1 may be advantageously employed as thickening agents in the manufacture of emulsion-type coatings and in the formulation of petroleum base greases.

*Example 3*

This example describes the preparation of an adduct from butadiene-styrene rubber known to the trade as GRS–X–26 and containing 71 percent butadiene and 29 percent styrene. One hundred grams of the rubber was added to 1200 g. of benzene and the whole stirred for 2 days. At the end of that time practically all of the rubber had gone into solution. Employing the reaction equipment described in Example 1, the resulting reaction mixture was heated to the point where the benzene began to distill off and to the distilling mixture there was added 1000 g. of ethyl fumarate over a period of 2 hours. At the end of that period the temperature of the reaction mixture was 185° C. The whole was then maintained with stirring at 190–198° C. for about 4.5 hours and then at 195–205° C. for another additional 4.5 hours. The reaction mixture was then transferred into another vessel. Distillation of this reaction mixture to remove unreacted material was effected by heating it at a pressure of 1–2 mm. Hg at an oil-bath temperature of 180° C. A total of 901 g. of distillate was recovered. There was thus obtained 171.9 g. of a viscous residue analyzing 73.07% C and 8.86% H. It was an adduct in which 71.9 g. (0.419 mole) of the ethyl fumarate had added to 1.46 moles of the rubber, i. e., an average of 0.286 mole of the fumarate had combined with each butene unit of the rubber. The calculated values for an adduct in which an average of 0.286 mole of fumarate is combined with each butene unit of a 71:21 butadiene-styrene copolymer are 75.9% C and 8.53% H; considering the impurities present in the commercial rubber, the calculated values agree well with the above found values. A material recovery of 97.6 percent was realized.

The adduct may be used as a plasticizing component of synthetic and/or natural rubber blends.

*Example 4*

In this example a butadiene-acrylonitrile rubber, known to the trade as Paracil A. J. and containing 5.74% nitrogen, is reacted with ethyl fumarate.

A solution of 120 g. of the rubber in 1200 g. of ethyl methyl ketone was heated to a temperature at which the ketone began to distill off and 1200 g. of ethyl fumarate was added to the distilling reaction mixture while the solvent was being distilled off. The whole was then stirred for 9 hours at 190–196° C. At the end of that time the liquid portion of the mixture was transferred into another vessel and distilled under partial vacuum to remove 968 g. of unreacted ethyl fumarate. There was thus obtained as distillation residue 201 g. of a material which was liquid at a temperature of up to 185° C./1.2 mm. Analysis of the residue gave 70.28% C, 8.56% H, 2.59% N and (by difference) 18.57% O. Another 74 g. of the adduct was obtained by extracting the solid remaining in the reaction vessel after removal of the liquid portion and distilling the extract. A material recovery of 98.9 percent was realized.

*Example 5*

Solid polybutadiene was reacted with diethyl fumarate by heating a solution of 120 g. of the polybutadiene in 1080 g. of benzene to a temperature at which the benzene began to distill off and then adding to the distilling solution 1200 g. of ethyl fumarate during a time of about 1 hour. At this point the temperature of the reaction mixture was 140° C. It was brought to 205° C. within about 30 minutes and kept at a temperature of 204–209° C. for 10 hours. Distillation of the resulting reaction mixture to remove unreacted material gave 312 g. of a viscous residue, B. P. above 185° C./1–2 mm. $n_D^{25}$ 1.4853. Based on the recovered material the residue was a polybutadiene-ethyl fumarate adduct in which an average of 0.512 mole of ethyl fumarate has combined with each butene unit of the polymer. Analysis of the adduct gave 66.84% C, 8.38% H and (by difference) 24.7% O. These values agree well with the calculated values (C, 68.4%; H, 8.57%) for an adduct in which an average of 0.512 mole of ethyl fumarate is combined with each butene unit of polybutadiene. The material recovery in the present instance was substantially quantitative.

*Example 6*

This example shows that a synthetic rubber containing even a small percent of a dienic hydrocarbon will form an adduct with a fumarate. A solution of butyl rubber known to the trade as GRI and containing less than 5 percent of isoprene was prepared by milling 100 g. of the rubber on a cold mill for 15 minutes, adding the milled rubber to 1100 g. of hexane and agitating the resulting mixture for 2 days at the end of which time all of the rubber had gone into solution. Employing the reaction equipment of Example 1, the reaction was effected by adding 1000 g. of ethyl fumarate to the distilling solution during a period of 2 hours and 15 minutes, heating the whole with vigorous stirring at 185–190° C. for 4 hours and then at 195–205° C. for another 4 hours. Upon cooling the reaction mixture separated into 2 layers. The upper layer was separated, washed with methanol and dried. Analysis of the dried product gave 83.91% C, 13.91% H and (by difference) 2.18% O, which indicated that the diethyl fumarate had added to the butyl rubber.

*Example 7*

Reaction of ethyl fumarate and a 95:5 butadiene-styrene rubber known to the trade as GRS–X–632 was effected as follows:

To a solution of 60 g. of the rubber in 540 g. of benzene there was added 600 g. of ethyl fumarate during 1 hour and 35 minutes while heating the reaction mixture at the distilling point of the benzene. At the end of this time the temperature of the reaction mixture was 165° C. Another 200 g. of ethyl fumarate was then added, and the reaction temperature brought up to 180° C. The whole was then maintained at a temperature of 170° C. to 210° C. for 8 hours. Distillation of the resulting reaction mixture to remove material boiling up to 180° C./1–2 mm. gave 677 g. of ethyl fumarate, $n_D^{25}$ 1.4498. The residue, 117 g., comprised a highly viscous adduct of the butadiene-styrene copolymer and ethyl fumarate analyzing 70.89% C, 8.77% H and (by difference) 20.34 percent oxygen. It was an adduct in which an average of 0.32 mole of ethyl fumarate had added to each butene unit of the rubber. The calculated values (C, 72.6%; H, 8.80%) of an adduct in which an average of 0.32 mole of the fumarate is combined with each butene unit of a 95:5 butadiene-styrene copolymer agree well with the found values given above, considering the generally present impurities in the synthetic rubber.

What I claim is:

1. A viscous adduct of (1) a rubber-like synthetic product selected from the class consisting of polymerization products of aliphatic, dienic hydrocarbons of from 4 to 8 carbon atoms and copolymerization products of said hydrocarbons with unsaturated, organic substances capable of copolymerizing therewith with (2) an transester having the formula

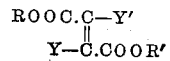

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 7 to 11 carbon atoms and the furfuryl and tetrahydrofurfuryl radicals, and Y and Y' are selected from the class consisting of hydrogen, chlorine and the methyl radical, from 1 to 2 moles of said ester being combined at each of at least 5 percent of the olefinic units of said rubber-like synthetic product, said adduct having been prepared by heating the polymerization product with the ester at a temperature of from 150° C. to 225° C.

2. A viscous adduct of a butadiene-styrene rubber-like copolymer and an alkyl fumarate in which the alkyl radical has from 1 to 8 carbon atoms, from 1 to 2 moles of said fumarate being combined at each of at least 5 percent of the butene units of said copolymer, said adduct having been prepared by heating the copolymer with the fumarate at a temperature of from 150° C. to 225° C.

3. A viscous adduct of a butadiene-acrylonitrile rubber-like copolymer with an alkyl fumarate in which the alkyl radical has from 1 to 8 carbon atoms, from 1 to 2 moles of said fumarate being combined at each of at least 5 percent of the butene units of said rubber-like synthetic copolymer, said adduct having been prepared by heating the copolymer with the fumarate at a temperature of from 150° C. to 225° C.

4. A viscous adduct of a butene-butadiene rubber-like copolymer and an alkyl fumarate in which the alkyl radical has from 1 to 8 carbon atoms, from 1 to 2 moles of said fumarate being combined at each of at least 5 percent of the butene units of said rubber-like synthetic copolymer, said adduct having been prepared by heating the copolymer with the fumarate at a temperature of from 150° C. to 225° C.

5. A viscous adduct of rubber-like polybutadiene and an alkyl fumarate in which the alkyl radical has from 1 to 8 carbon atoms, from 1 to 2 moles of said fumarate being combined at each of at least 5 percent of the butene units of said rubber-like synthetic copolymer, said adduct having been prepared by heating the polybutadiene with the fumarate at a temperature of from 150° C. to 225° C.

6. A viscous adduct of ethyl fumarate and a butadiene-styrene copolymer containing at least 70 percent by weight of butadiene with the balance being styrene, 1 mole of said fumarate being combined at each of at least 50 percent of the butene units of said copolymer, said adduct having been prepared by heating the copolymer with the fumarate at a temperature of from 150° C. to 225° C.

7. A viscous adduct of ethyl fumarate and a rubber-like butadiene-acrylonitrile copolymer, 1 mole of said fumarate being combined at each of at least 50 percent of the butene units of said copolymer, said adduct having been prepared by heating the copolymer with the fumarate at a temperature of from 150° C. to 225° C.

8. A viscous adduct of ethyl fumarate and a rubber-like butene-butadiene copolymer, 1 mole of said fumarate being combined at each of at least 50 percent of the butene units of said copolymer, said adduct having been prepared by heating the copolymer with the fumarate at a temperature of from 150° C. to 225° C.

9. A viscous adduct of ethyl fumarate and a rubber-like polybutadiene, 1 mole of said fumarate being combined at each of at least 50 percent of the butene units of said copolymer, said adduct having been prepared by heating the polybutadiene with the fumarate at a temperature of from 150° C. to 225° C.

10. The method which comprises heating at a temperature of from 150° C. to 225° C. (1) a rubber-like synthetic product selected from the class consisting of polymerization products of aliphatic, dienic hydrocarbons of from 4 to 8 carbon atoms and copolymerization products of said hydrocarbons with unsaturated, organic substances capable of copolymerizing therewith with (2) a transester having the formula

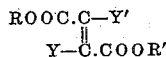

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 7 to 11 carbon atoms and the furfuryl and tetrahydrofurfuryl radicals, and Y and Y' are selected from the class consisting of hydrogen, chlorine and the methyl radical, and recovering from the resulting reaction product viscous adducts in which from 1 to 2 moles of said ester are combined at each of at least 5 percent of the olefinic units of said rubber-like synthetic product.

11. The method which comprises heating at a temperature of from 150° C. to 225° C. a rubber-like butadiene-styrene copolymer with an alkyl fumarate in which the alkyl radical has from 1 to 8 carbon atoms and recovering from the resulting reaction product a viscous adduct in which from 1 to 2 moles of said fumarate are combined at each of at least 5 percent of the butene units of said rubber-like synthetic product.

12. The method which comprises heating at a temperature of from 150° C. to 225° C. a rubber-like butadiene-acrylonitrile copolymer with an alkyl fumarate in which the alkyl radical has from 1 to 8 carbon atoms and recovering from the resulting reaction product viscous adducts in which from 1 to 2 moles of said fumarate are combined at each of at least 5 percent of the butene units of said rubber-like synthetic product.

13. The method which comprises heating at a temperature of from 150° C. to 225° C. a rubber-like butene-butadiene copolymer with an alkyl fumarate in which the alkyl radical has from 1 to 8 carbon atoms and recovering from the resulting reaction product viscous adducts in which from 1 to 2 moles of said fumarate are combined at each of at least 5 percent of the butene units of said rubber-like synthetic product.

14. The method which comprises heating at a temperature of from 150° C. to 225° C. a rubber-like polybutadiene with an alkyl fumarate in which the alkyl radical has from 1 to 8 carbon atoms and recovering from the resulting reaction product viscous adducts in which from 1 to 2 moles of said fumarate are combined at each of at least 5 percent of the butene units of said rubber-like synthetic product.

15. The method which comprises heating at a temperature of from 150° C. to 225° C. ethyl fumarate with a butadiene-styrene copolymer having at least 70 percent by weight of butadiene at a temperature of 150–225° C. and in the presence of an inert diluent, and recovering from the resulting reaction product a viscous adduct in which 1 mole of said fumarate has combined with each of at least 50 percent of the butene units of said copolymer.

16. The method which comprises heating at a temperature of from 150° to 225° C. ethyl fumarate with a rubber-like butadiene-acrylonitrile copolymer at a temperature of 150–225° C. and in the presence of an inert diluent, and recovering from the resulting reaction product a viscous adduct in which 1 mole of said fumarate has combined with each of at least 50 percent of the butene units of said copolymer.

17. The method which comprises heating at a temperature of from 150° C. to 225° C. ethyl fumarate with a rubber-like butene-butadiene copolymer at a temperature of 150–225° C. and in the presence of an inert diluent, and recovering from the resulting reaction product a viscous adduct in which 1 mole of said fumarate has combined with each of at least 50 percent of the butene units of said copolymer.

18. The method which comprises heating at a temperature of from 150° C. to 225° C. ethyl fumarate with a rubber-like polybutadiene at a temperature of 150–225° C. and in the presence of an inert diluent, and recovering from the resulting reaction product a viscous adduct in which 1 mole of said fumarate has combined with each of at least 50 percent of the butene units of said copolymer.

19. As a new product, a compound selected from the class consisting of viscous adducts of (1) a rubber-like synthetic product selected from the class consisting of polymerization products of aliphatic, dienic hydrocarbons of from 4 to 8 carbon atoms and copolymerization products of said hydrocarbons with unsaturated, organic substances capable of copolymerizing therewith with (2) a trans-ester having the formula

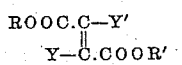

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 7 to 11 carbon atoms and the furfuryl and tetrahydrofurfuryl radicals, and Y and Y' are selected from the class consisting of hydrogen, chlorine and the methyl radical, from 1 to 2 moles of said ester being combined at each of at least 5 percent of the olefinic units of said rubber-like synthetic product; and the free acids and alkali metal and ammonium salts obtained by hydrolysis of said adducts, said adducts having been prepared by heating the hydrocarbons with the esters at a temperature of from 150° C. to 225° C.

References Cited in the file of this patent

UNITED STATES PATENTS

| | | |
|---|---|---|
| 2,383,569 | Roberts | Aug. 28, 1945 |
| 2,634,256 | Sparks et al. | Apr. 7, 1953 |